Dec. 17, 1963  W. M. KAUFFMANN ETAL  3,114,358
CONTROL SYSTEM FOR MULTI-FUEL ENGINE
Filed Sept. 20, 1962  3 Sheets-Sheet 1

WILLIAM M. KAUFFMANN
MARTIN C. METZGER
DONALD E. SCHULTZ
INVENTORS

BY Daniel W. Bobis
Atty

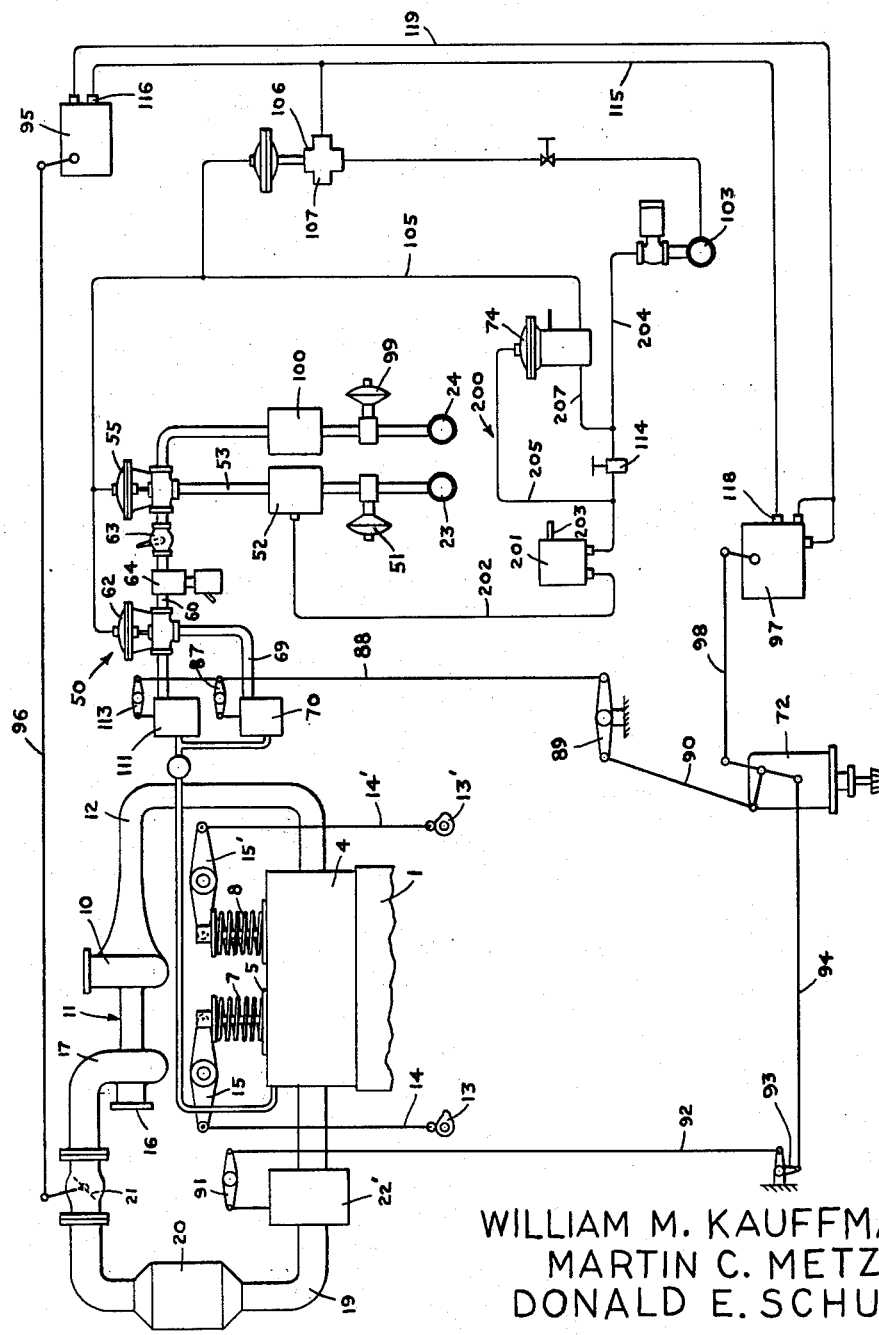

United States Patent Office 3,114,358
Patented Dec. 17, 1963

3,114,358
CONTROL SYSTEM FOR MULTI-FUEL ENGINE
William M. Kauffmann, Hamburg, Martin C. Metzger, West Seneca, and Donald E. Schultz, Williamsville, N.Y., assignors to Worthington Corporation, Harrison, N.J., a corporation of Delaware
Filed Sept. 20, 1962, Ser. No. 224,941
13 Claims. (Cl. 123—120)

This invention relates to internal combustion engines having prime and emergency sources of fuel supply and more particularly to a control system for such engines which is sensitive to the pressures of one of the sources of fuel supply and operates to selectively supply either prime or emergency fuel as is demanded by the engine.

While the present concept may be stated as being useful as a means for regulating the fuel supply in a multi-fuel internal combustion engine it will be obvious from the description that follows that the present control system is particularly adapted for use with turbo-charged internal combustion engines operating on gaseous fuels with spark ignition of the combustible charge.

In the operation of such engines, the ratio of gaseous fuel to combustion air must at all times be maintained within a narrow, critical range in order that spark discharge can cause ignition and combustion of the whole fuel-air mixture charged to the engine. Additionally and to prevent erratic operation in such engines, it becomes necessary to provide means for admission of the fuel-air charge which provides a thorough homogeneous fuel-air mixture.

The foregoing engines may normally be operated on gases having a limited range of heating value in terms of B.t.u.'s per cubic foot. In installations of the type wherein natural gas is the prime fuel and propane is the emergency fuel, it is obvious because of the differences in heating value of the respective gases that it becomes necessary to provide means for stabilizing the gas-air ratio and at the same time provide for admission of the charge to insure a thorough admixture of the fuel and air prior to introduction into the working cylinder.

While natural gas and propane are referred to, it is not intended that the control system of the present invention be limited to these gases as it will be obvious to one skilled in this art that other gases may be used for both the prime and emergency fuel.

Accordingly it is an object of the present invention to provide an improved control system, characterized by its simplicity of operation and for maintaining the close control over the fuel-air ratio, and for maintaining this control even though the engine is adapted for selective operation on either a prime or emergency fuel.

It is another object of this invention to provide for either manual or automatic change-over from a prime fuel to an emergency fuel and from one of the fuels to the other.

It is a further object of this invention to provide a control system which provides for selection of either prime or emergency fuel and which control system comprises a plurality of common elements.

Other objects and advantages of the invention including the basic design and the nature of the improvements thereon will appear from the following description taken in conjunction with the following drawings, in which:

In the drawings:

FIGURE 6 shows a fragmentary view of a turbo-charged internal combustion engine and indicated therewith more or less diagrammatically is an automatic control system incorporating the concepts of the present invention.

The drawings are to be understood to be more or less of a diagrammatic character for the purpose of illustrating and disclosing a typical or preferred form of the improvements contemplated herein and in the drawings like reference characters identify the same parts in the several views.

Figure 1:
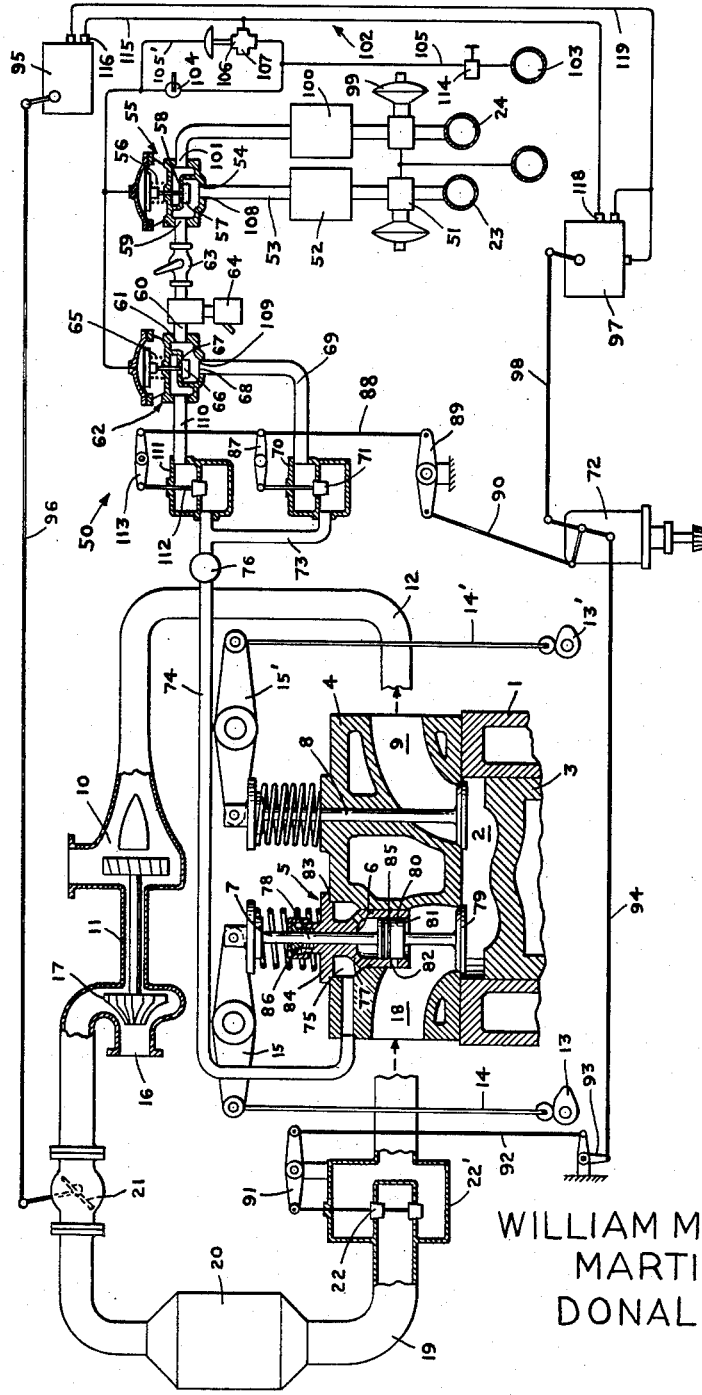
FIGURE 1 is a fragmentary vertical section taken centrally through a typical turbo-charged internal combustion engine cylinder and indicated therewith more or less diagrammatically is the control system for supplying either prime or emergency fuel to said turbo-charged internal combustion engine.
Figure 2:
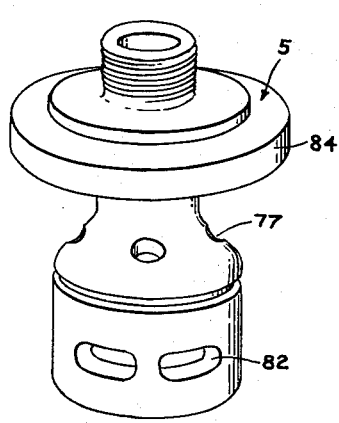
FIGURE 2 is a perspective view showing the valve housing including the guide formed on the inner portion thereof.
Figure 3:
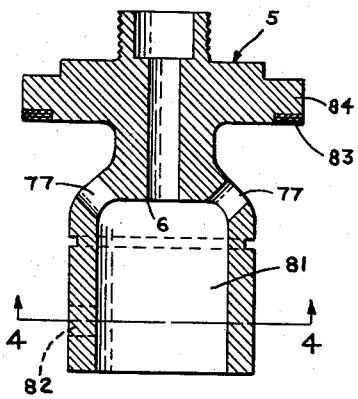
FIGURE 3 is a vertical section of the valve housing shown in FIGURES 1 and 2 of the drawings.
Figure 4:
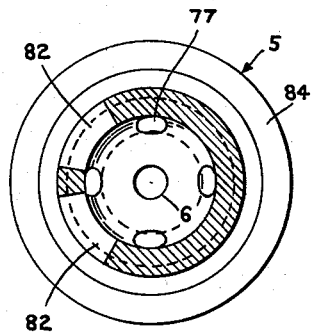
FIGURE 4 is a section taken on lines 4—4 of the valve housing shown on FIGURE 3.

Referring to the exemplary embodiment of the invention in FIGURE 1, there is shown a portion of a turbo-charged gas engine comprising a cylinder block 1 having cylinder 2 formed therein. Piston 3 is disposed to reciprocate in the cylinder 2. The usual cylinder head 4 is mounted on the block 1. A valve housing 5 is mounted in the head 4 and includes a guide 6 on the inner portion thereof. The inlet valve 7 is movably mounted in the guide 6 and will be described in more detail hereinafter. Exhaust valve 8 is also movably mounted in the head 4 and admits burned gases to the passage 9 which is connected to the turbine 10 of the turbo-charger 11 by passage or header 12. The usual spark means (not shown) ignites the charge admitted to the cylinder by inlet valve 7 and passed to the turbine as the exhaust valve 8 is opened. The usual cams 13 and 13', links 14 and 14' and levers 15 and 15' are provided respectively for the inlet and exhaust valves to operate same. The working air for the engine is supplied to inlet 16 of the compressor 17 and is pressurized thereby. The pressurized air is passed from the compressor 17 to the inlet passage 18 formed in the head 4 by an interconnecting conduit or header 19. The pressurized air is cooled as it flows through header 19 by an aftercooler 20 disposed in said header. First and second regulating means 21 and 22 shown respectively as a butterfly valve and an air metering valve means are also respectively disposed in the header 19 and in air metering valve casing 22'. These valves function to provide initial and fine regulation of the quantity of air passing to the inlet passage 18 of the engine as desired and are connected to the multi-fuel control system generally designated 50 as will be described hereinfter.

The gas for said engine is derived from a prime and emergency fuel source respectively designated 23 and 24. In the exemplary embodiment shown in FIGURES 1 and 6 natural gas or methane is used as the prime fuel source and propane is used as the emergency fuel source. As was mentioned above due to the differences in heat value of these gases (1,000 B.t.u.'s per cubic foot for natural gas vs. 2,400 B.t.u.'s per cubic foot for propane) it becomes necessary to provide means for stabilizing the air-fuel ratio during change from one gas to the other.

This is accomplished with the provision of a multi-fuel control system designated 50 including a plurality of common elements which add to the simplicity of the arrangement. Referring to FIGURE 1 an arrangement is shown wherein such conversion can be accomplished manually and the control system, its components and operation will be discussed in detail in the portion of the description which follows.

Natural gas is supplied from the source 23 and passed to regulator 51 (which is purchasable on the open market) and said regulator regulates the fuel to a predetermined pressure (25 p.s.i. may be suitable for natural gas) before it is passed to reservoir 52. The reservoir functions to smooth any pulsations present in the fuel. Natural gas from reservoir 52 is then passed through conduit 53 to the lower inlet 54 of a first diaphragm operated three way valve 55. In the arrangement shown in FIGURE 1 the control system 50 is set to pass natural gas or prime fuel to the engine as the pressure on the diaphragm of the valve 55 is minimum. As a consequence the spring 56 moves the valve disc 57 to seat on the upper seats 58. Natural gas then passes through horizontal outlet 59 of valve 55 and through the conduit 60 to the horizontal inlet 61 of a second diaphragm operated three way valve 62. A manual cock 63 and shutdown valve 64 are disposed in the conduit 60. As will be apparent the elements 63 and 64 are provided to isolate the control system when shutdown of the engine is required as when repairs are necessary.

Since the same pressure (as was acting on the diaphragm valve 55) is acting on the diaphragm of valve 62, the spring 65 of valve 62 will move the valve disc 66 to seat on the upper seats 67. Accordingly prime fuel will flow out the outlet 68 into conduit 69 which is connected to fuel metering valve housing 70. Fuel metering valve 71 mechanically connected to the governor 72 operates to meter fuel into conduit 73 which is connected to main or common header 74 which leads into the fuel inlet passage 75 formed in the head 4 of the engine. A balancing cock 76 is disposed in header 74. The fuel inlet passage is an annular like chamber formed between the inner walls of the head 4 and outer walls of the inlet valve housing 5. A plurality of ports 77 communicate the fuel inlet passage 75 with the interior of the valve housing 5. For convenience in the present description the fuel inlet passage can be said to comprise the portion of the cylinder 81 above the piston 80. The inlet valve 7 includes a stem portion 78 slidably disposed in a guide 6 formed in the housing 5. The usual spring and disc arrangement are provided for mechanically connecting the inlet valve to the operating lever 15 of the means for operating the inlet valve. The main disc 79 of the inlet valve is spaced relative the cylinder to regulate passage of fluid from inlet passage 18 to the cylinder. The seats for the valve disc are formed in the lower portion of the head 4. Additionally means taking the form of a piston 80 is disposed relative the fuel inlet passage and slidably mounted in cylinder 81 formed in the housing 5 and this piston functions to regulate the passage of fuel into the inlet passage 18 from the fuel inlet passage 75. This is accomplished as is clearly shown in the drawings by movement of piston 80 passed or downwardly beyond the openings 82 formed at the lower end of the housing 5. Shims 83 are mounted between the top of the head 4 and the annular flange 84 of the housing 5 to provide a means for setting the timing of the engine as is required when new fuels are introduced. The usual rings 85 mounted on the piston 80 and packing gland 86 threadably connected to the housing 5 at the upper portion thereof are provided to preclude leakage of fuel.

Proper air fuel ratio is obtained by interconnecting the fuel metering means 71; through levers 87, link 88, lever 89 and link 90 with the governor 72. Additionally the second regulating means 22 is connected to the governor 72 by a lever 91, link 92, lever 93 and link 94. The first regulating means 21 is also connected to the governor 72 by a combined mechanical and pneumatic system. Specifically the valve 21 is connected to a positioner 95 by a link 96. The positioner 95 is pneumatically connected to a position transmitter 97 which is mechanically connected to the governor by link 98. The positioner 95 and position transmitter 97 are well known control elements purchasable on the open market.

In the event of a loss of pressure in the natural gas source, applicants provide means for rapid conversion to an emergency fuel which is described herein as propane. Many of the components for passing the emergency fuel to the engine are identical to those described hereinabove for providing for the passage of natural gas to the engine. Now considering a situation where it is desirable to supply emergency fuel and to accomplish this result the applicants provide a source 24 of emergency or propane fuel.

A regulator 99 also functions to provide the propane fuel at a predetermined pressure to reservoir 100. The fuel is passed to the horizontal inlet 101 of valve 55. Means generally designated 102 including an air source or the like 103 interconnect the valves 55 and 62 and the means 102 is adjusted by a manual valve 104 to supply pressure to the tops of the diaphragms of each of the valves 55 and 62. More particularly by manipulating valve 104 to permit passage of fluid through the line 105 directly to the tops of the diaphragms will cause the diaphragms to overcome the spring tension serving to maintain the discs seated on the upper seats. Normally the valve 104 is disposed so that fluid from the source 103 passes through valve 106 and through vent 107 to atmosphere accordingly as discussed above when the manual cock 104 is adjusted to permit a major portion of the fluid flowing in line 105 to pass to the tops of the diaphragms; this in effect causes a diaphragm to move the discs 57 and 66 to seat on lower seats 108 and 109 of the first and second three way valves which closes off natural gas from conduit 53 and causes gas from conduit 60 to pass through valve 62 into conduit 110. Conduit 110 is connected to a second fuel metering housing 111. A fuel metering valve 112 is mounted in the housing and operated by lever 113 which is mechanically connected to the governor 72 in similar fashion as was described above for valve 70.

Air flowing from the source 103 into the conduit or the like 105 is regulated to a desired pressure by a reducing valve 114 disposed just downwardly from the point where the air enters conduit 105.

A pneumatic source is also provided for the positioner 95 and position transmitter 97. Specifically a conduit 115 is connected to the valve 106 and the conduit 115 interconnects the positioner 95 at 116 to the position transmitter 97 at 118.

A control circuit is provided for between elements 95 and 97 with the provision of conduit or the like 119.

In normal operation, it will be obvious that the manual 3-way valve 104 is set so that the air flowing in conduit 105 is shut off by valve 104. Also air in conduit leading to diaphragms of valves 55, 62, and 106 is vented to atmosphere through valve 104. Accordingly the springs will cause the discs 57 and 66 of valves 55 and 62 to seat on the upper seats 58 and 67. Natural gas from source 23 is free to flow from reservoir 52 through conduit 53, valve 55, valve 62, conduit 69 into the fuel metering housing 70. The natural gas is metered by the fuel metering valve 71 which is set by the governor so that the desired amount of fuel is passed to the fuel inlet passage 75. Venting of line 105 to diaphragm of valve 106 opens supply port of valve 106 so that air under pressure flows from line 105 to line 115. This activates the positioner 95 and position transmitter 97 control system to adjust the first regulating valve 21 so that opening of the valve is in accordance with the control cam in the position transmitter 97. At the same time the governor 72 sets the second regulating means 22 to provide the fine adjustment for the quantity of air required in inlet passage 18 for operation with natural gas.

In a situation where the prime fuel supply pressure drops, the operator simply positions the valve 104 so that air from source 103 pressurizes the diaphragms of valves 55 and 62 to move the discs 57 and 66 to seats 108 and 109. At the same time the air flowing from valve 106 into conduit 115 to positioner 95 and position transmitter 97 is vented to atmosphere through 107 to cause positioner 95 to fully open the first regulating means 21. The governor means 72 then regulates the fuel metering valve 112 and second regulating means 22 so as to provide the proper air-fuel ratio prescribed for operation on propane.

Figure 5:
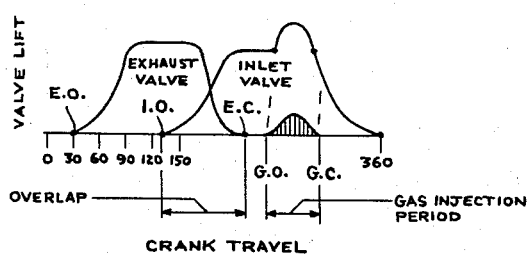
FIGURE 5 is a diagram illustrating the inlet, gas injection, and exhaust valve lift areas vs. the crankshaft travel for the turbo-charged internal combustion engine embodying the present invention.

Additionally introduction of fuel air and air mixture to the cylinder and control of the inlet and exhaust valves is in accordance with the schematic diagram shown in FIGURE 5 of the drawings.

Of course it will be obvious that variations from the exemplary arrangement shown in FIGURE 5 are permissible all within the scope of the present invention.

FIGURE 6 shows a modified form of control system which is adapted to automatically provide for changeover from one fuel to the other and functions in the manner described above regarding the control system of the type shown in FIGURE 1 and adapted for manual operation.

Those parts having generally the same construction and purpose as the corresponding parts in FIGURE 1 have been given the same reference characters.

Instead of having a manual control 104 as is shown in FIGURE 1 an automatic arrangement generally designated 200 is incorporated with the reservoir 52 containing natural gas or prime fuel. Now referring particularly to FIGURE 6 a shutdown control which may be a positioner and designated 201 is connected by line 202 to the receiver or reservoir 52 containing natural gas.

Upon gas supply failure or reduction in gas pressure in reservoir 52 control 201 vents control air pressure from line 205 to atmosphere through vent 203. Air vented from line 205 causes diaphragm of valve 74 to open valve 74 thereby permitting air from line 207 to pass through line 105 to the tops of the diaphragms in valves 55 and 62 which permit emergency fuel to pass to the engine and discontinue prime fuel as previously described for manual operation.

The increased pressure in line 105 is in turn passed to the diaphragm of valve 106 which opens vent 107 and permits air pressure to pass from line 115 to atmosphere, thus deactivating position transmitter 97 and positioner 95 by discontinuing pressure supply to position transmitter 97 and positioner 95. This causes positioner 95 to move control rod 96 to fully open butterfly valve 21. At the same time governor 72 moves valve 111 and valve 221 in housing 22.

Conduit 119 is the control air pressure line which pressure is regulated by position transmitter 97 which in turn is controlled by governor 72 through connecting rod 98 and related levers. This provides signal air pressure to positioner 95 which in turn positions primary air metering means 21 during normal operation on natural gas. Venting of line 115 for propane operation eliminates control signal pressure causing positioner 95 to fully open air valve 21 thus transferring air metering function to valve 22.

In operation it is obvious from the foregoing that emergency gas operation is accomplished by pressurizing diaphragms 55 and 62 at the same time venting line 115 to atmosphere through vent 107 which causes positioner 95 to fully open valve 21 and governor control of air and gas metering devices 112 and 22.

With the foregoing arrangement emergency gas will permit the engine to continue to operate at the particular load where the changeover was effected without the requirement of a speed or power adjustment.

Although the invention has been described with reference to specific aparatus it will be appreciated that a wide variety of changes may be made within the ability of one skilled in the art without departing from the scope of this invention. For example some of the components of the apparatus may be reversed, certain features of the invention may be used independently of others, and equivalents may be substituted for the apparatus, all within the spirit and scope of the invention as defined in the appended claims.

What is claimed is:

1. A control system for use with an internal combustion engine including a turbo-charger, said turbo-charger connected to a source of air and operative to supply air to said internal combustion engine, a prime and emergency fuel source for said internal combustion engine, said internal combustion engine including a cylinder, an inlet passage in said engine and said inlet passage connected to said cylinder, conduit means connecting said turbo-charger to said inlet passage whereby said turbo-charger supplies air thereto, first regulating means disposed in said conduit means to initially regulate the quantity of air passing to said inlet passage, second regulating means disposed in said conduit means and downstream from said first regulating means to provide fine regulation of the quantity of air flowing to said inlet passage, a governor means connected to said first and second regulating means, a fuel inlet passage in said engine, said fuel inlet passage connected to said inlet passage, an inlet valve disposed in said inlet passage and said inlet valve including means disposed in said fuel inlet passage and said means operative to control admission of fuel from said fuel inlet passage to said inlet passage, an exhaust valve connected to said cylinder, means on the engine for operating said inlet and exhaust valves, said control system comprising a prime supply and control means for supplying fuel from said prime fuel source to said fuel inlet passage at a predetermined pressure, an emergency supply and control means for supplying emergency fuel from said emergency fuel source to said fuel inlet passage at a predetermined pressure, said prime supply and control means and said emergency supply and control means comprising a plurality of common elements; and adjusting means connected to each of said prime supply and control means, said emergency supply and control means and said governor means to adjust said prime supply and control means and said emergency supply and control means so that fuel from either said prime fuel source or said emergency fuel source is selectively supplied to said fuel inlet passage and said adjusting means to adjust said governor to adjust said first and second regulating means to supply a predetermined quantity of air according to whether prime or emergency fuel is selected.

2. The control system claimed in claim 1 wherein said plurality of common elements comprises first and second diaphragm actuated three way valves and said adjusting means including an air supply source having means connected to each of said first and second diaphragm actuated three way valves to set same so that fuel from either said prime or emergency fuel source is selectively supplied to said fuel inlet passage.

3. The control system claimed in claim 2 wherein said adjusting means includes a first positioner mechanically connected to said governor means, a second positioner mechanically connected to said first regulating means, a first conduit means interconnecting said first and second positioners, and second conduit means interconnecting said first conduit means to said means connected to each of said first and second diaphragm actuated three way valves.

4. The control system claimed in claim 3 wherein said adjusting means includes manual means for causing said adjusting means to set said first and second diaphragm operated three way valves and said governor means to a predetermined position so that said engine will operate on either prime or emergency fuel.

5. The control system claimed in claim 1 wherein said adjusting means includes automatic means connected to said prime fuel source to sense the pressure thereof and said automatic means to cause said adjusting means to set said first and second diaphragm operated three way valves and said governor means to a predetermined position so that said engine is operative on either prime or emergency fuel.

6. In combination with an internal combustion engine having a turbo-charger, said turbo-charger connected to a source of air and operative to supply air to said internal combustion engine, a prime and emergency fuel source for said internal combustion engine, said internal combustion engine including a cylinder, an inlet passage in said engine and said inlet passage connected to said cylinder, conduit means connecting said turbo-charger to said inlet passage whereby said turbo-charger supplies air thereto, first regulating means disposed in said conduit means to initially regulate the quantity of air passing to said inlet passage second regulating means disposed in said conduit means and downstream from said first regulating means to provide fine regulation of the quantity of air flowing to said inlet passage, a governor means connected to said first and second regulating means, a fuel inlet passage in said engine, said fuel inlet passage connected to said inlet passage, an inlet valve disposed in said inlet passage and said inlet valve including means disposed in said fuel inlet passage and said means operative to control admission of fuel from said fuel inlet passage to said inlet passage, an exhaust valve connected to said cylinder, means on the engine for operating said inlet and exhaust valves, said control system comprising a prime supply and control means for supplying fluid from said prime fuel source to said fuel inlet passage at a predetermined pressure, an emergency supply and control means for supplying emergency fuel from said emergency fuel source to said fuel inlet passage at a predetermined pressure, said prime supply and control means and said emergency supply and control means comprising a plurality of common elements; and adjusting means connected to each of said prime supply and control means, said emergency supply and control means and said governor means to adjust said prime supply and control means and said emergency supply and control means so that fuel from either said prime fuel source or said emergency fuel source is selectively supplied to said fuel inlet passage and said adjusting means to adjust said governor to adjust said first and second regulating means to supply a predetermined quantity of air according to whether prime or emergency fuel is selected.

7. The combination claimed in claim 6, wherein said plurality of common elements comprises first and second diaphragm actuated three way valves and said adjusting means includes an air source having means connected to each of said first and second diaphragm actuated three way valves to set same so that fuel from either said prime or emergency fuel source is selectively supplied to said fuel inlet passage.

8. The combination claimed in claim 7 wherein said adjusting means includes a first positioner mechanically connected to said governor means, a second positioner mechanically connected to said first regulating means, a first conduit means interconnecting said first and second positioners, and a second conduit means interconnecting said first conduit means to said means connected to each of said first and second diaphragm actuated three way valves.

9. The combination claimed in claim 8 wherein said adjusting means includes manual means for causing said adjusting means to set said first and second diaphragm operated three way valves and said governor means to a predetermined position so that said engine will operate on either prime or emergency fuel.

10. The combination claimed in claim 8 wherein said adjusting means includes automatic means connected to said prime fuel source to sense the pressure thereof and said automatic means to cause said adjusting means to set said first and second diaphragm operated three way valves and said governor means to a predetermined position so that said engine is operated on either prime or emergency fuel.

11. The combination claimed in claim 10 wherein said inlet valve comprises a combination fuel and air inlet means.

12. The combination claimed in claim 10 wherein said control system includes first and second fuel metering valves and mechanical means connecting said first and second fuel metering valves to said governor means for operation by said governor means.

13. A control system for use with an internal combustion engine including a turbo-charger connected to a source of air and operative to supply air to said internal combustion engine, a prime and emergency fuel source for said internal combustion engine, said internal combustion engine including a cylinder, an inlet passage in said engine and said inlet passage connected to said cylinder, conduit means connecting said turbo-charger to said inlet passage whereby said turbo-charger supplies air thereto, first regulating means disposed in said conduit means to initially regulate the quantity of air passing to said inlet passage, second regulating means disposed in said conduit means and downstream from said first regulating means to provide fine regulation of the quantity of air flowing to said inlet passage, a governor means connected to said first and second regulating means, said control system comprising a prime supply and control means for supplying fuel from said prime fuel source to said engine at a predetermined pressure, an emergency supply and control means for supplying emergency fuel from said emergency fuel source to said engine at a predetermined pressure, said prime supply and control means and said emergency supply and control means comprising a plurality of common elements; and adjusting means connected to each of said prime supply and control means, said emergency supply and control means and said governor means to adjust said prime supply and control means and said emergency supply and control means so that fuel from either said prime fuel source or said emergency fuel source is selectively supplied to said engine passage and said adjusting means to adjust said governor to adjust said first and second regulating means to supply a predetermined quantity of air according to whether prime or emergency fuel is selected.

References Cited in the file of this patent

UNITED STATES PATENTS

| | | |
|---|---|---|
| 1,899,869 | Heusser | Feb. 28, 1933 |
| 2,198,516 | Schuette | Apr. 23, 1940 |
| 2,544,978 | Blessing et al. | Mar. 13, 1951 |
| 2,606,108 | Ensign | Aug. 5, 1952 |
| 2,690,167 | Moulton | Sept. 28, 1954 |
| 2,794,430 | Moulton | June 4, 1957 |
| 2,927,562 | Lafferty et al. | Mar. 8, 1960 |